(12) United States Patent
Takeichi et al.

(10) Patent No.: US 12,115,622 B2
(45) Date of Patent: Oct. 15, 2024

(54) EYEGLASS LENS PERIPHERAL EDGE PROCESSING SYSTEM AND NON-TRANSITORY COMPUTER-READABLE STORAGE MEDIUM

(71) Applicant: NIDEK CO., LTD., Aichi (JP)

(72) Inventors: Kyoji Takeichi, Aichi (JP); Tadamasa Yamamoto, Aichi (JP)

(73) Assignee: NIDEK CO., LTD., Aichi (JP)

( * ) Notice: Subject to any disclaimer, the term of this patent is extended or adjusted under 35 U.S.C. 154(b) by 1050 days.

(21) Appl. No.: 17/060,340

(22) Filed: Oct. 1, 2020

(65) Prior Publication Data

US 2021/0101246 A1    Apr. 8, 2021

(30) Foreign Application Priority Data

Oct. 3, 2019 (JP) .................................. 2019-183316
Oct. 3, 2019 (JP) .................................. 2019-183317

(51) Int. Cl.
*B24B 9/14* (2006.01)
*G02C 7/02* (2006.01)

(52) U.S. Cl.
CPC .............. *B24B 9/148* (2013.01); *B24B 9/146* (2013.01); *G02C 7/024* (2013.01)

(58) Field of Classification Search
CPC ........... B24B 9/002; B24B 9/005; B24B 9/14; B24B 9/146; B24B 9/148; B24B 27/0023; B24B 27/0038; B24B 27/0076
See application file for complete search history.

(56) References Cited

U.S. PATENT DOCUMENTS

| 5,454,194 | A | | 10/1995 | Gottschald |
| 5,908,348 | A | * | 6/1999 | Gottschald ................ B24B 9/14 451/5 |
| 5,967,879 | A | * | 10/1999 | Gottschald .............. B24B 49/04 451/10 |

(Continued)

FOREIGN PATENT DOCUMENTS

| CN | 206500957 U | 9/2017 |
| CN | 105437019 B | 10/2017 |

(Continued)

OTHER PUBLICATIONS

Office Action dated Apr. 4, 2023, issued by Japanese Patent Office for Japanese Application No. 2019-183316.

(Continued)

*Primary Examiner* — Joel D Crandall
(74) *Attorney, Agent, or Firm* — Sughrue Mion, PLLC

(57) ABSTRACT

An eyeglass lens peripheral edge processing system includes a plurality of eyeglass manufacturing devices and a robot arm. The plurality of eyeglass manufacturing devices 1 perform mutually different steps out of a plurality of steps for processing the eyeglass lens, and include mutually different housings. The robot arm includes an arm unit and a holding unit. The arm unit has a plurality of joint portions. The holding unit is disposed in the arm unit to hold and release an object. The robot arm rotates the arm unit via the joint portion to move the object held by the holding unit. The robot arm rotates the arm unit to move the eyeglass lens between the plurality of eyeglass manufacturing devices.

11 Claims, 9 Drawing Sheets

(56) References Cited

U.S. PATENT DOCUMENTS

| | | | |
|---|---|---|---|
| 6,283,825 B1* | 9/2001 | Ulloa | B24B 57/02 451/6 |
| 2005/0255609 A1 | 11/2005 | Kumagai et al. | |
| 2007/0213861 A1 | 9/2007 | Takeichi | |
| 2011/0067628 A1* | 3/2011 | Savoie | B29D 11/00423 118/500 |
| 2012/0083186 A1 | 4/2012 | Shibata | |
| 2012/0209416 A1* | 8/2012 | Tanaka | B24B 9/148 700/112 |
| 2012/0252315 A1 | 10/2012 | Natsume et al. | |
| 2013/0270759 A1* | 10/2013 | Schneider | B29D 11/00942 269/55 |
| 2019/0375065 A1 | 12/2019 | Sato et al. | |

FOREIGN PATENT DOCUMENTS

| | | |
|---|---|---|
| CN | 109500690 A | 3/2019 |
| CN | 109773617 A | 5/2019 |
| CN | 109834545 A | 6/2019 |
| EP | 2436481 A2 | 4/2012 |
| EP | 2505306 A1 | 10/2012 |
| EP | 3254805 A1 | 12/2017 |
| JP | 2003-200337 A | 7/2003 |
| JP | 2004-174669 A | 6/2004 |
| JP | 2012-183633 A | 9/2012 |
| JP | 2012-223829 A | 11/2012 |
| JP | 2014-188642 A | 10/2014 |
| WO | WO-9520466 A1 * | 8/1995 ........... B24B 13/005 |
| WO | 2016/186060 A1 | 11/2016 |
| WO | 2018/092222 A1 | 5/2018 |

OTHER PUBLICATIONS

Office Action dated Apr. 4, 2023, issued by Japanese Patent Office for Japanese Application No. 2019-183317.

Extended European Search Report dated Feb. 23, 2021, issued by the European Patent Office in counterpart European Application No. 20199595.8.

Communication dated Mar. 3, 2023 issued by the European Patent Office in counterpart European Patent Application No. 20199595.8.

Office Action issued on Nov. 30, 2023 by the Chinese Patent Office in corresponding CN Patent Application No. 202011058431.5.

* cited by examiner

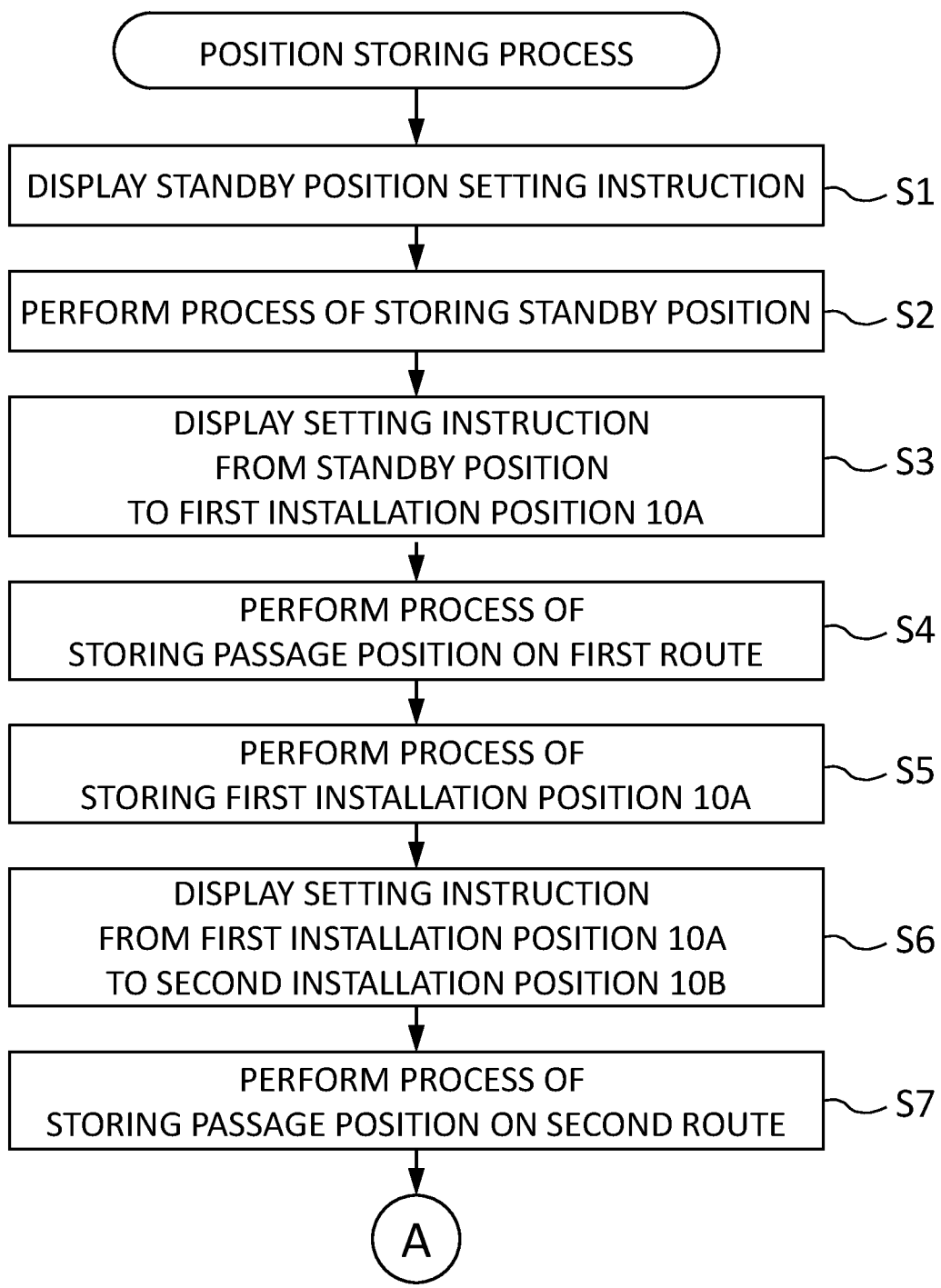

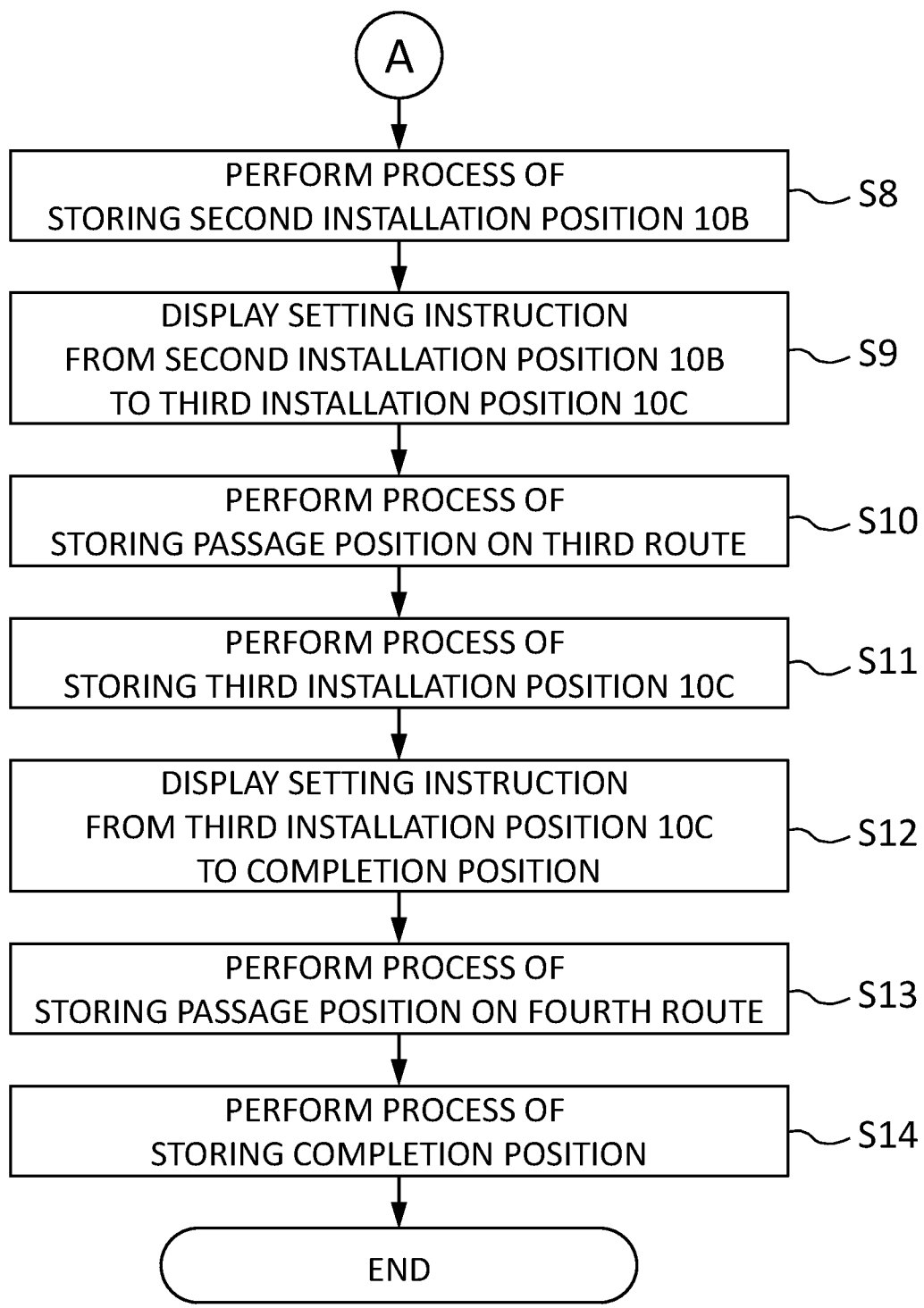

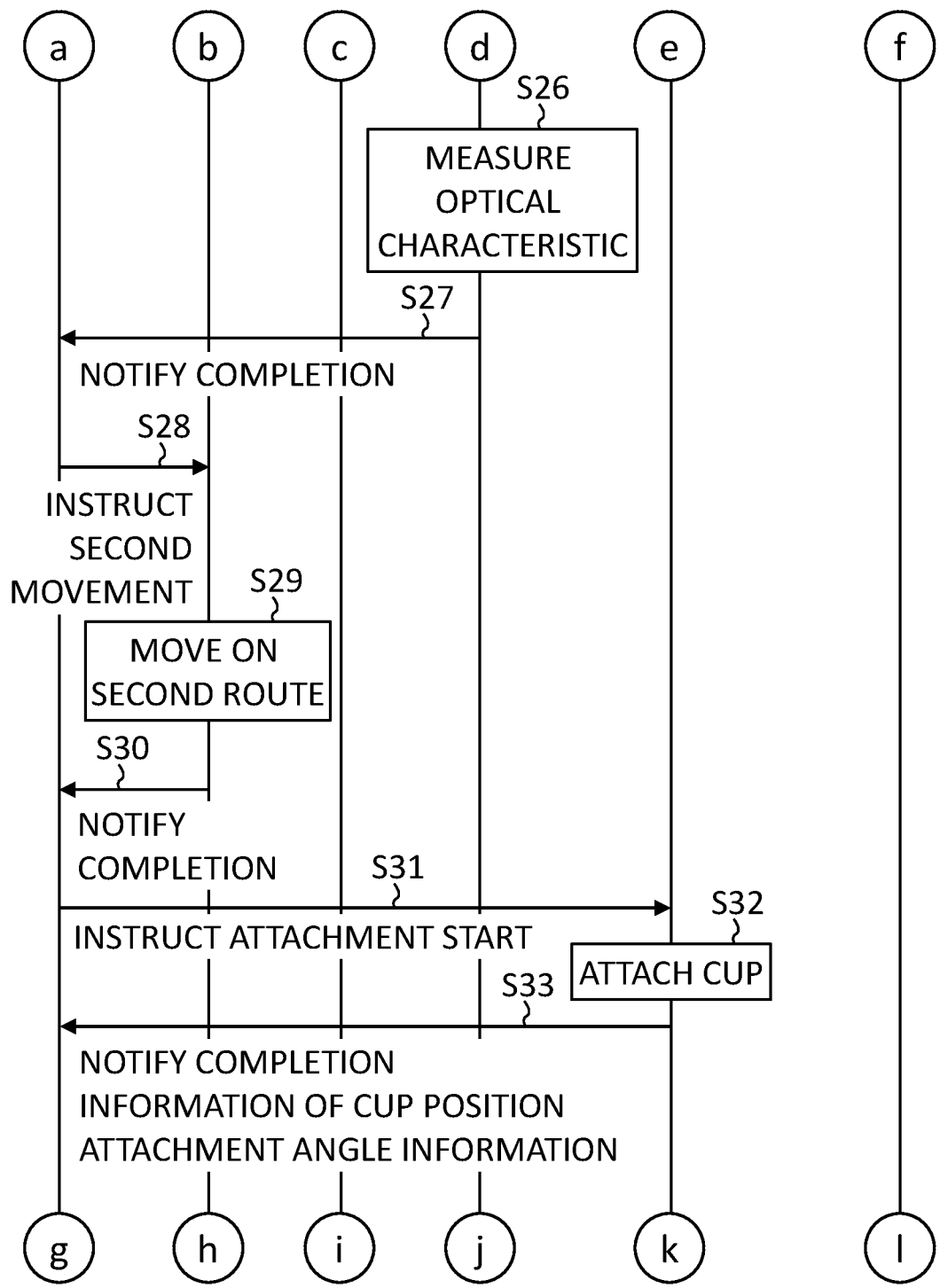

EYEGLASS LENS PERIPHERAL EDGE PROCESSING SYSTEM AND NON-TRANSITORY COMPUTER-READABLE STORAGE MEDIUM

CROSS-REFERENCE TO RELATED APPLICATION

This application claims priority from Japanese Patent Applications No. 2019-183316 filed on Oct. 3, 2019 and No. 2019-183317 filed on Oct. 3, 2019, the entire subject-matter of which is incorporated herein by reference.

TECHNICAL FIELD

The present disclosure relates to an eyeglass lens peripheral edge processing system that processes a peripheral edge of an eyeglass lens, and a non-transitory computer-readable storage medium storing an eyeglass lens peripheral edge processing program executed in the eyeglass lens peripheral edge processing system.

BACKGROUND

Various techniques have been proposed in order to process a peripheral edge of an eyeglass lens. For example, according to an eyeglass lens supply system disclosed in JP-A-2012-183633, a plurality of lens peripheral edge processing devices are disposed along a plurality of conveyor line units connected to each other to serve as one conveyor line. A robot is disposed between each of the lens peripheral edge processing devices and each of the conveyor line units. The robot moves a lens between each of the lens peripheral edge processing devices and each of the conveyor line units.

The system disclosed in JP-A-2012-183633 can process the lens with using any one of the plurality of lens peripheral edge processing devices disposed along the conveyor line units. However, the system does not cause each step to be performed by each of plural types of devices for performing different steps. Here, it is conceivable to perform a plurality of steps on the lens as follows. The system disclosed in JP-A-2012-183633 is improved so that the plural types of devices for performing the different steps are included in the system. However, even when the system disclosed in JP-A-2012-183633 is changed, the plural types of devices need to be disposed along the conveyor line units. Consequently, a positional relationship between the devices and the conveyor lines is likely to be limited depending on a configuration of the robot. Therefore, according to a technology in the related art, the system is less likely to easily perform the plurality of steps for processing the eyeglass lens.

SUMMARY

An object of the present disclosure is to provide an eyeglass lens peripheral edge processing system and a non-transitory computer-readable storage medium storing an eyeglass lens peripheral edge processing program executed in the eyeglass lens peripheral edge processing system, in which plural types of devices for performing different steps can more properly perform a plurality of steps for processing an eyeglass lens.

There is provided with an eyeglass lens peripheral edge processing system that processes a peripheral edge of an eyeglass lens, including:
 a plurality of eyeglass manufacturing devices that perform mutually different steps out of a plurality of steps for processing the eyeglass lens, and that include mutually different housings; and
 a robot arm that includes an arm unit having a plurality of joint portions, and a holding unit provided in the arm unit to hold and release an object, and that rotates the arm unit via the joint portion to move the object held by the holding unit,
 in which the robot arm rotates the arm unit to move at least an eyeglass lens serving as the object between the plurality of eyeglass manufacturing devices.

There is provided with an eyeglass lens peripheral edge processing system that processes a peripheral edge of an eyeglass lens, including:
 a plurality of eyeglass manufacturing devices that perform mutually different steps out of a plurality of steps for processing the eyeglass lens, and that include mutually different housings;
 a robot arm that includes an arm unit having a plurality of joint portions, and a holding unit provided in the arm unit to hold and release an object, and that rotates the arm unit via the joint portion to move the object held by the holding unit; and
 a controller that performs:
  a position storing process of storing installation position information indicating an installation position where the eyeglass lens is installed and unloaded for each of the plurality of eyeglass manufacturing devices, in a memory device; and
  a movement process of controlling an operation of the robot arm based on the installation position information stored in the memory device, to move the eyeglass lens from the installation position of one device out of the plurality of eyeglass manufacturing devices to the installation position of another device out of the plurality of eyeglass manufacturing devices.

There is provided with an non-transitory computer-readable storage medium storing an eyeglass lens peripheral edge processing program executed in an eyeglass lens peripheral edge processing system that processes a peripheral edge of an eyeglass lens,
 in which the eyeglass lens peripheral edge processing system includes:
  a plurality of eyeglass manufacturing devices that performs mutually different steps out of a plurality of steps for processing the eyeglass lens, and that include mutually different housings;
  a robot arm that includes an arm unit having a plurality of joint portions, and a holding unit provided in the arm unit to hold and release an object, and that rotates the arm unit via the joint portion to move the object held by the holding unit; and
  a controller,
 the eyeglass lens peripheral edge processing program being executed by the controller of the eyeglass lens peripheral edge processing system to cause the eyeglass lens peripheral edge processing system to perform:
  a position storing process of storing installation position information indicating an installation position where the eyeglass lens is installed and unloaded for each of the plurality of eyeglass manufacturing devices, in a memory device; and
  a movement process of controlling an operation of the robot arm based on the installation position information stored in the memory device, to move the eyeglass lens from the installation position of one device out of the plurality of eyeglass manufacturing devices to the installation position of another device out of the plurality of eyeglass manufacturing devices.

According to the eyeglass lens peripheral edge processing system and the non-transitory computer-readable storage medium storing the eyeglass lens peripheral edge processing program in the present disclosure, the plural types of devices for performing the different steps can more properly perform the plurality of steps for processing the eyeglass lens.

BRIEF DESCRIPTION OF DRAWINGS

FIGS. 3A and 3B are a flowchart of a position storing process performed by the eyeglass lens peripheral edge processing system 100.

FIGS. 4A to 4C are a timing chart of a movement process performed by the eyeglass lens peripheral edge processing system 100.

DETAILED DESCRIPTION

<Outline>

Figure 1:
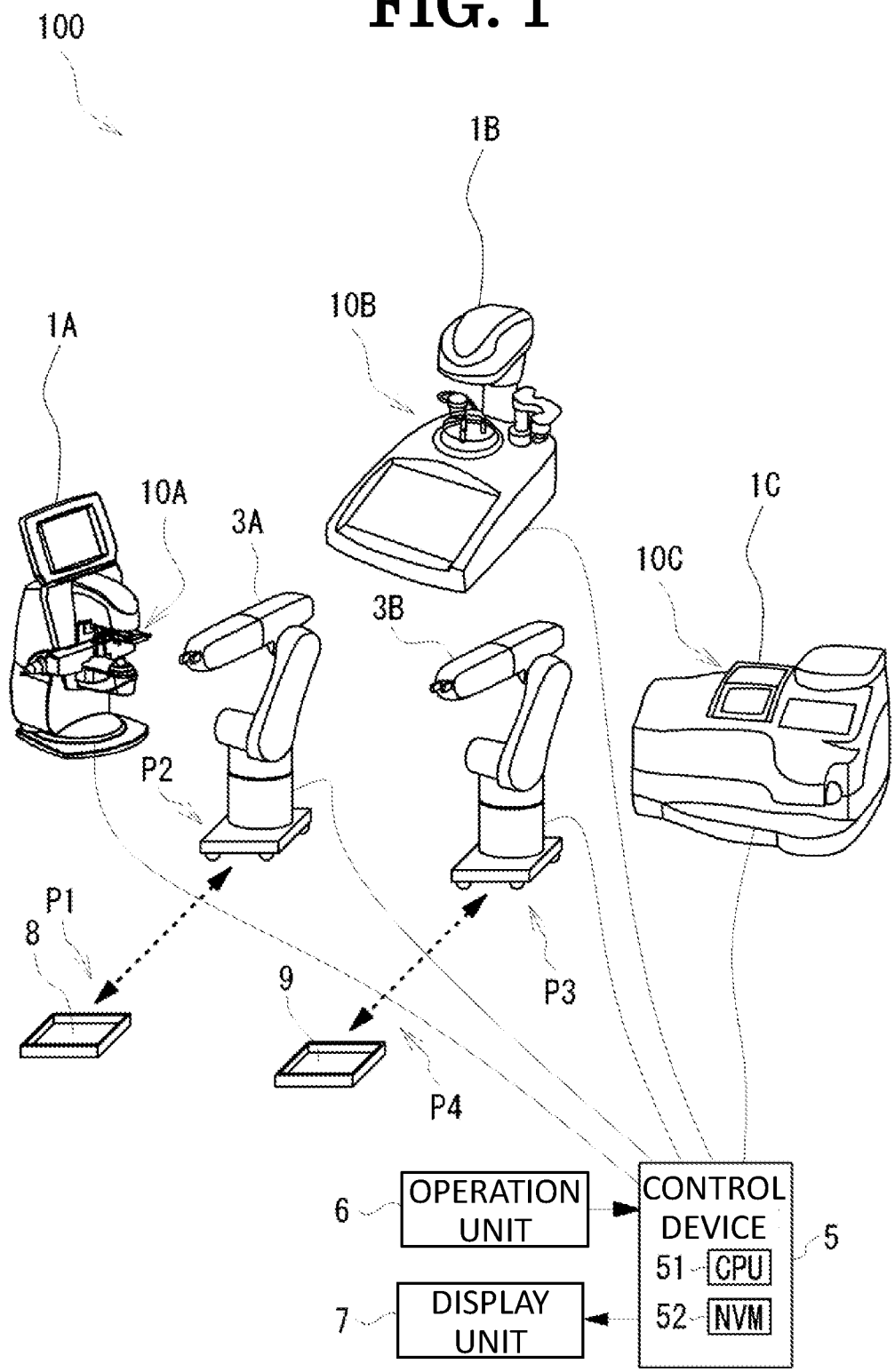
FIG. 1 is a view illustrating a schematic configuration of an eyeglass lens peripheral edge processing system 100.

An eyeglass lens peripheral edge processing system described as an example in the present disclosure includes a plurality of eyeglass manufacturing devices and a robot arm. The plurality of eyeglass manufacturing devices perform mutually different steps out of a plurality of steps for processing an eyeglass lens, and have mutually different housings. The robot arm includes an arm unit and a holding unit. The arm unit has a plurality of joint portions. The holding unit is provided in the arm unit to hold and release an object. The robot arm rotates the arm unit via the joint portion to move the object held by the holding unit. The robot arm rotates the arm unit so that at least the eyeglass lens serving as the object is moved between the plurality of eyeglass manufacturing devices.

According to the eyeglass lens peripheral edge processing system described as an example in the present disclosure, the eyeglass lens is moved by the robot arm between the plurality of eyeglass manufacturing devices in different housings (that is, the respective housings are separated from each other) for performing different steps. Therefore, even when a user does not move the eyeglass lens between the plurality of devices, each device performs the plurality of steps on the eyeglass lens. Furthermore, the arm unit of the robot arm has the plurality of joint portions. Accordingly, a positional relationship between the plurality of devices is less likely to be limited, compared to a case where the eyeglass lens is moved between the plurality of devices by a robot having a single rotation axis or a conveyor. Therefore, the plurality of steps required for processing the eyeglass lens are smoothly performed on the eyeglass lens by each of the plurality of eyeglass manufacturing devices.

The robot arm may pivot the holding unit around a rotation axis extending in a direction intersecting with an installation surface to orient the holding unit toward each of the eyeglass manufacturing devices so that the eyeglass lens is moved between the plurality of eyeglass manufacturing devices. In this case, a worker can freely dispose the plurality of eyeglass manufacturing devices for the robot arm. That is, unlike a case where the eyeglass lens is moved between the plurality of devices by the conveyor, disposition of the plurality of devices is much less likely to be limited. Therefore, a space for installing the eyeglass lens peripheral edge processing system is less likely to be limited, and an installation space is easily reduced.

The robot arm may perform both an operation for pivoting the holding unit to orient the holding unit toward the eyeglass manufacturing device and an operation for driving the arm unit to change a distance between the eyeglass manufacturing device and the holding unit. In this case, the disposition of the plurality of eyeglass manufacturing devices is much less likely to be limited.

The installation surface of the robot arm may be a horizontal surface. The plurality of eyeglass manufacturing devices may be disposed to surround the robot arm along a circumferential direction round on the rotation axis (hereinafter, referred to as a "pivot axis") around which the robot arm installed on the installation surface pivots the holding unit. In this case, for example, compared to a case where the plurality of eyeglass manufacturing devices are aligned on a straight line along the conveyor, a space for installing the eyeglass lens peripheral edge processing system can be more easily reduced. Furthermore, the robot arm pivots the holding unit. In this manner, the robot arm can easily move (switch) the eyeglass lens between the plurality of eyeglass manufacturing devices disposed to surround the robot arm. Therefore, the eyeglass lens is more properly processed.

In a case where three or more eyeglass manufacturing devices are used, the plurality of eyeglass manufacturing devices may be disposed clockwise or counterclockwise in the order of performing the steps on the eyeglass lens when viewed in a direction of the pivot axis of the robot arm. In this case, the robot arm can smoothly move the eyeglass lens to each of the plurality of eyeglass manufacturing devices in the order of performing the steps.

In addition, in the eyeglass lens peripheral edge processing system, a standby position where the eyeglass lens stands before the plurality of steps are performed by the plurality of eyeglass manufacturing devices may be set. The standby position may be provided at a position that surrounds the robot arm along the circumferential direction round on the pivot axis together with the plurality of eyeglass manufacturing devices. In addition, in the eyeglass lens peripheral edge processing system, a completion position for moving the eyeglass lens after the plurality of steps are completed by the plurality of eyeglass manufacturing devices may be set. The completion position may be provided at a position that surrounds the robot arm along the circumferential direction round on the pivot axis together with the plurality of eyeglass manufacturing devices. In this case, an installation space of the eyeglass lens peripheral edge processing system including at least one of the standby position and the completion position can be further reduced.

The robot arm may further include an arm movement unit that moves the arm unit in a direction which is at least parallel to a placement surface. In this case, the robot arm can properly move the object by moving the arm unit itself in a direction parallel to the placement surface, even in a case where a movement distance of the object is longer than a movable range of the arm unit. Therefore, the plurality of eyeglass lens peripheral edge processing devices are freely disposed in a further improved manner.

In addition, the arm movement unit may move the arm unit in a direction (height direction) perpendicular to the placement surface. In this case, for example, an insertion angle when the eyeglass lens is inserted into the eyeglass manufacturing device is freely set in a further improved manner by changing a height of the arm unit.

However, a position of the robot arm may be fixed. Even in this case, the plurality of eyeglass manufacturing devices is freely disposed in a sufficiently improved manner, compared to a case where only a conveyor is used. In addition, in a case where the arm movement unit is used, the arm movement unit may move the arm unit in both the direction parallel to the placement surface and the direction perpendicular to the installation surface, or may move the arm unit only in one of the direction parallel to the placement surface and the direction perpendicular to the installation surface.

The eyeglass lens peripheral edge processing system may include a plurality of the robot arms. In this case, each of the plurality of robot arms can be independently driven. Accordingly, the plurality of eyeglass lenses can be moved in parallel by the plurality of robot arms. Therefore, the plurality of steps can be more smoothly performed. In addition, the object (for example, the eyeglass lens) may be transferred between the plurality of robot arms. In this case, compared to a case where one robot arm is used, a range in which the object can be moved by the robot arm is enlarged. Therefore, the eyeglass lens peripheral edge processing system is freely disposed in the further improved manner.

An eyeglass lens peripheral edge processing system described as an example in the present disclosure includes a plurality of eyeglass manufacturing devices, a robot arm, and a controller. The plurality of eyeglass manufacturing devices perform mutually different steps out of a plurality of steps for processing an eyeglass lens, and have mutually different housings. The robot arm includes an arm unit and a holding unit. The arm unit has a plurality of joint portions. The holding unit is provided in the arm unit to hold and release an object. The robot arm rotates the arm unit via the joint portion to move the object held by the holding unit. The controller performs various controls on the eyeglass lens peripheral edge processing system. The controller performs a position storing process and a movement process. The controller that performs the position storing process stores installation position information indicating an installation position where the eyeglass lens is installed and unloaded for each of the plurality of eyeglass manufacturing devices, in a memory device. The controller that performs the movement process controls an operation of the robot arm based on the installation position information stored in the memory device, to move the eyeglass lens from the installation position of one device out of the plurality of eyeglass manufacturing devices to the installation position of another device out of the plurality of eyeglass manufacturing devices.

According to the eyeglass lens peripheral edge processing system described as an example in the present disclosure, the installation position information of the eyeglass lens for each of the plurality of eyeglass manufacturing devices is stored in advance. The eyeglass lens is moved from the installation position of one eyeglass manufacturing device to the installation position of another eyeglass manufacturing device by controlling the operation of the robot arm, based on the stored installation position information. That is, regardless of disposition of the plurality of eyeglass manufacturing devices, the installation position of each device is stored so that the eyeglass lens is properly moved (switched) between the devices by the robot arm. Therefore, the plurality of devices is freely disposed in the improved manner. In addition, even in a case where the disposition of the plurality of devices is changed, the robot arm is properly driven. Therefore, the plurality of steps for processing the eyeglass lens are smoothly performed on the eyeglass lens by each of the plurality of eyeglass manufacturing devices.

A specific method in which the eyeglass lens peripheral edge processing system that stores various positions (hereinafter, referred to as "storing target positions") including the installation position can be appropriately selected. As an example, in the eyeglass lens peripheral edge processing system according to the present disclosure, a relative positional relationship of the storing target position with respect to the robot arm is stored. Specifically, a worker manually rotates the joint portion of the robot arm, and causes an operation unit to input a storing instruction to the eyeglass lens peripheral edge processing system in a state where the holding unit of the robot arm is disposed at the storing target position. The controller stores a position of the holding unit in the memory device when the storing instruction is input, as the storing target position. The above-described operation is repeatedly performed so that a plurality of the storing target positions are properly stored in the memory device. However, it is possible to change a method of storing the storing target position. For example, the worker may operate the operation unit, and may input the storing target position to the eyeglass lens peripheral edge processing system. In this manner, the storing target position may be stored in the memory device.

The controller that performs the movement process may communicate with each of the plurality of eyeglass manufacturing devices and the robot arm. In this manner, the controller may determine each state of the plurality of eyeglass manufacturing devices and the robot arm, and may output a drive instruction to each of the plurality of eyeglass manufacturing devices and the robot arm, based on the determined state. For example, each of the plurality of eyeglass manufacturing devices and the robot arm may output a completion notification to the controller in a case where an operation instructed by the controller is completed. The controller waits for an output of the drive instruction in a case where the completion notification is not input from the device to be driven (at least one of the plurality of eyeglass manufacturing devices and the robot arm). The controller outputs the drive instruction to the device in a case where the completion notification is input from the device to be driven and it is determined that the device is in an operation-stopped state. In this case, the eyeglass lens peripheral edge processing system can output the drive instruction at a proper timing, based on a state of each device.

When the position storing process is performed, the controller may store standby position information indicating a standby position where the eyeglass lens stands before the plurality of steps are performed by the plurality of eyeglass manufacturing devices in the memory device. When the movement process is performed, the controller may control the operation of the robot arm based on the standby position information and the installation position information which are stored in the memory device, to move the eyeglass lens from the standby position to the installation position of the eyeglass manufacturing device, which first performs a step on the eyeglass lens, out of the plurality of eyeglass manufacturing devices. In this case, the eyeglass lens installed at the standby position is automatically moved to the installation position of the eyeglass manufacturing device by the robot arm, and the plurality of steps are performed on the eyeglass lens. Therefore, a worker can more easily process the eyeglass lens with using the eyeglass lens peripheral edge processing system.

However, it is possible to omit the control for moving the eyeglass lens from the standby position to the first eyeglass manufacturing device. Even in this case, the worker can easily manufacture the eyeglass in the eyeglass lens peripheral edge processing system, only by installing the eyeglass lens at the installation position of the first eyeglass manufacturing device.

When the position storing process is performed, the controller may store completion position information indicating a completion position where the eyeglass lens reaches after the plurality of steps by the plurality of eyeglass manufacturing devices are completed. When the movement process is performed, the controller may control the operation of the robot arm based on the installation position information and the completion position information which are stored in the memory device, to move the eyeglass lens to the completion position from the installation position of the eyeglass manufacturing device, which lastly performs the step on the eyeglass lens, out of the plurality of eyeglass manufacturing devices. In this case, the eyeglass lens on which the plurality of steps are completed is automatically moved to the completion position by the robot arm. Therefore, the worker can more easily handle the eyeglass lens on which the plurality of steps are completed.

However, it is possible to omit the control for moving the eyeglass lens from the last eyeglass manufacturing device to the completion position. Even in this case, the worker can easily handle the eyeglass lens, only by unloading the eyeglass lens from the installation position of the last eyeglass manufacturing device. In addition, the standby position and the completion position may be the same position, or may be different positions.

When the position storing process is performed, in addition to the installation position, the controller may further store passage position information indicating a passage position on a movement route of the eyeglass lens moved by the robot arm in the memory device, as the storing target position. When the movement process is performed, the controller may control the operation of the robot arm based on the installation position information and the passage position information which are stored in the memory device, to move the eyeglass lens to pass through the passage position. In this case, a proper passage position is stored in the memory device so that the eyeglass lens moves to pass through a proper route. Therefore, for example, a possibility that the moving eyeglass lens may fall after colliding with the housing of the device is reduced. Each of a route for moving the eyeglass lens to the installation position and a route for moving the eyeglass lens from the installation position can be set to the proper route. Therefore, the eyeglass lens is more smoothly processed.

The plurality of eyeglass manufacturing devices may include a cup attachment device and a lens processing device. The cup attachment device attaches a cup to a lens surface of the eyeglass lens. The lens processing device mounts the eyeglass lens with mounting a chuck shaft on the cup attached to the eyeglass lens by the cup attachment device, and steps the peripheral edge of the mounted eyeglass lens. In this case, after the cup is attached to the eyeglass lens by the cup attachment device, the eyeglass lens is moved from the cup attachment device to the lens processing device by the robot arm, and the peripheral edge of the eyeglass lens is processed. Therefore, at least two steps for processing the eyeglass lens are smoothly performed by the eyeglass lens peripheral edge processing system including the plurality of devices.

The controller may acquire information of a position on the lens surface to which the cup is attached by the cup attachment device (hereinafter, referred to as a "cup position"). When g the eyeglass lens is moved to the installation position of the lens processing device, the controller may move the eyeglass lens to the installation position where the chuck shaft of the lens processing device and the cup position coincide with each other, based on the information of the cup position. That is, the controller may adjust the installation position of the lens processing device which moves the eyeglass lens, based on the cup position. In this case, regardless of the cup position which is changed depending on the eyeglass lens, the chuck shaft of the lens processing device is properly mounted on the cup. Therefore, the eyeglass lens is more smoothly processed.

A specific method for moving the eyeglass lens can be appropriately selected, based on the information of the cup position. For example, the memory device may store the installation position of the eyeglass lens in the lens processing device in a case where the cup is attached to a reference position of the lens surface (for example, a center of the lens surface). In this case, the controller may acquire a direction and a distance in which the cup position is displaced from the reference position on the lens surface, based on the information of the cup position, and may adjust the installation position of the lens processing device for moving the eyeglass lens so that the displaced direction and distance are offset.

The controller may acquire information of an attachment angle at which the cup attached to the eyeglass lens by the cup attachment device is attached to the eyeglass lens. When the eyeglass lens is moved to the installation position of the lens processing device, the controller may set an angle at the installation position of the eyeglass lens to which the cup is attached, based on the information of the attachment angle. In this case, regardless of the attachment angle of the cup which is changed depending on to the eyeglass lens, the chuck shaft of the lens processing device is properly mounted on the cup. Therefore, the eyeglass lens is more smoothly processed.

A specific method for setting an angle of the eyeglass lens at the installation position of the lens processing device can be appropriately selected, based on the information of the attachment angle of the cup. For example, the information of the angle of the eyeglass lens at the installation position of the lens processing device in a case where the cup is attached to the eyeglass lens at a reference angle (for example, at an angle parallel to an optical axis) may be included in the installation position information indicating the installation position of the lens processing device which is stored in the memory device. In this case, the controller may acquire displacement between the reference angle and the attachment angle, based on the information of the attachment angle of the cup, and may adjust the angle of the eyeglass lens at the installation position of the lens processing device so that the displacement of the angle is offset.

The plurality of eyeglass manufacturing devices used in the eyeglass lens peripheral edge processing system are not limited to two of the cup attachment device and the lens processing device. For example, in addition to the cup attachment device and the lens processing device, a lens meter for measuring an optical characteristic of the eyeglass lens may be included in the eyeglass lens peripheral edge processing system. In this case, first, the lens meter performs a lens measurement step which is one of the plurality of steps for processing the peripheral edge of the eyeglass lens. Next, the cup attachment device performs a processing preparation step which is one of the steps for processing the eyeglass lens. Next, the lens processing device performs a processing step. That is, in a case where the lens meter, the cup attachment device, and the lens processing device are included in the eyeglass lens peripheral edge processing device, the eyeglass lens peripheral edge processing device performs the lens measurement step, the processing preparation step, and the processing step, as the plurality of steps for processing the eyeglass lens.

However, it is possible to omit one of the lens measurement step and the processing preparation step. For example, in a case where the lens processing device mounts the eyeglass lens without using the cup, and in a case where the lens processing device includes a function of attaching the cup to the eyeglass lens, the processing preparation step performed by the cup attachment device may be omitted (that is, the eyeglass lens peripheral edge processing system may not include the cup attachment device). In addition, in a case where the optical characteristic of the eyeglass lens is recognized in advance, the lens measurement step performed by the lens meter may be omitted. In addition to the eyeglass lens, the robot arm may move at least one of the cup and an eyeglass frame, as the object.

Embodiment (System Configuration)

Hereinafter, one of typical embodiments in the present disclosure will be described with reference to the drawings. First, referring to FIG. 1, a system configuration of an eyeglass lens peripheral edge processing system 100 according to the present embodiment will be described. The eyeglass lens peripheral edge processing system 100 according to the present embodiment includes a plurality of eyeglass manufacturing devices 1 (1A, 1B, and 1C), a robot arm 3 (3A and 3B), and a control device 5 which is applied as a controller in the eyeglass lens peripheral edge processing system 100.

The plurality of eyeglass manufacturing devices 1 perform mutually different steps, out of the plurality of steps for processing the peripheral edge of the eyeglass lens. In addition, each of the plurality of eyeglass manufacturing devices 1 has a mutually different housing. Each of the plurality of eyeglass manufacturing devices 1 includes a control unit (not illustrated) for performing various controls, and a memory device (not illustrated). Each memory device stores an eyeglass lens peripheral edge processing program for causing the eyeglass manufacturing device 1 to perform a movement process (refer to FIGS. 4A to 4C) to be described later. In the present embodiment, the plurality of eyeglass manufacturing devices 1 include a lens meter 1A, a cup attachment device (blocker) 1B, and a lens processing device (lens edger) 1C.

The lens meter 1A measures the optical characteristic of the eyeglass lens. In addition, the lens meter 1A according to the present embodiment can measure an optical center of the eyeglass lens. The lens meter 1A includes a measurement optical system (for example, a Shack-Hartmann optical system) for measuring the optical characteristic of the eyeglass lens. In addition, the lens meter 1A according to the present embodiment includes a point marking mechanism that marks a point at a position of the optical center of the eyeglass lens which is measured by the measurement optical system. The step performed by the lens meter 1A is an example of the lens measurement step which is one of the plurality of steps for processing the peripheral edge of the eyeglass lens.

The lens meter 1A performs an optical characteristic measurement step for processing the eyeglass lens on the eyeglass lens installed at an installation position 10A. When the measurement step is completed, the eyeglass lens is unloaded from the installation position 10A. The lens meter 1A according to the present embodiment can automatically perform the optical characteristic measurement step on the eyeglass lens installed at the installation position 10A. For example, the lens meter 1A may automatically measure the optical characteristic while changing the position of the eyeglass lens installed at the installation position 10A. In addition, the lens meter 1A may automatically measure the optical characteristic by scanning the eyeglass lens installed at the installation position 10A with measurement light.

The cup attachment device 1B attaches the cup to the lens surface of the eyeglass lens. The cup attached to the eyeglass lens is used as a jig for installing (mounting) the eyeglass lens on the lens processing device 1C. More specifically, the lens processing device 1C mounts the eyeglass lens so that the chuck shaft which pinches and holds the eyeglass lens is mounted on the cup. For example, the cup attachment device 1B attaches the cup to the eyeglass lens with reference to a point marked on the optical center of the eyeglass lens by the lens meter 1A. The cup attachment device 1B according to the present embodiment automatically detects a position of the marked point with using an incorporated camera, adjusts a relative positional relationship between the eyeglass lens and the cup, and attaches the cup to the eyeglass lens. In this manner, the cup can be automatically attached to a proper position for the eyeglass lens. As a technique for automatically attaching the cup to the proper position of the eyeglass lens, for example, a technique disclosed in JP-A-2019-100928 can be adopted. The cup attachment device 1B may be provided with a function of an eyeglass frame shape measurement device (tracer) for measuring a shape (target lens shape) of the eyeglass frame. The step performed by the cup attachment device 1B is an example of the processing preparation step which is one of the plurality of steps for processing the peripheral edge of the eyeglass lens.

The cup attachment device 1B performs the cup attachment step for processing the eyeglass lens on the eyeglass lens installed at the installation position 10B. When the attachment step is completed, the eyeglass lens is unloaded from the installation position 10B.

In addition, the cup attachment device 1B can output information of a position on the lens surface where the cup is attached to the eyeglass lens (hereinafter, referred to as "information of the cup position") to the control device 5. Furthermore, the cup attachment device 1B can output information of an angle of the cup attached to the eyeglass lens with respect to the eyeglass lens (hereinafter, referred to as "information of the attachment angle") to the control device 5. At least one of the information of the cup position and the information of the attachment angle may be stored in advance in a memory device (for example, the memory device 52 of the control device 5).

The lens processing device 1C mounts (inserts) the chuck shaft on the cup attached to an eyeglass lens, and pinches and holds (chucks) the eyeglass lens. The lens processing device 1C steps the peripheral edge of the eyeglass lens held by the chuck shaft into a target lens shape of the eyeglass frame. That is, the lens processing device 1C performs the processing step of processing the peripheral edge of the eyeglass lens. The lens processing device 1C includes a processing tool (for example, at least one of a grindstone and a cutter), and steps the peripheral edge of the eyeglass lens, based on data of the target lens shape of the eyeglass frame which is acquired by an eyeglass frame shape measurement device (not illustrated).

The lens processing device 1C performs the peripheral edge processing step on the eyeglass lens mounted on the chuck shaft at an installation position 10C. When the processing step is completed, the eyeglass lens is unloaded from the installation position 10C.

The robot arm 3 holds and moves the object. In the present embodiment, the object to be moved by the robot arm 3 includes the eyeglass lens. However, an object other than the eyeglass lens (for example, at least one of the eyeglass frame and the cup) may be moved by the robot arm 3. In addition, the eyeglass lens peripheral edge processing system 100 according to the present embodiment includes a plurality of robot arms 3 (specifically, a robot arm 3A and a robot arm 3B). Each of the plurality of robot arms 3 can be independently driven. Accordingly, the plurality of eyeglass lenses can be moved in parallel (simultaneously) by the plurality of robot arms 3. In addition, the object (eyeglass lens in the present embodiment) can be transferred between the plurality of robot arms 3. Therefore, the step of manufacturing the eyeglass lens is more smoothly performed.

Figure 2:
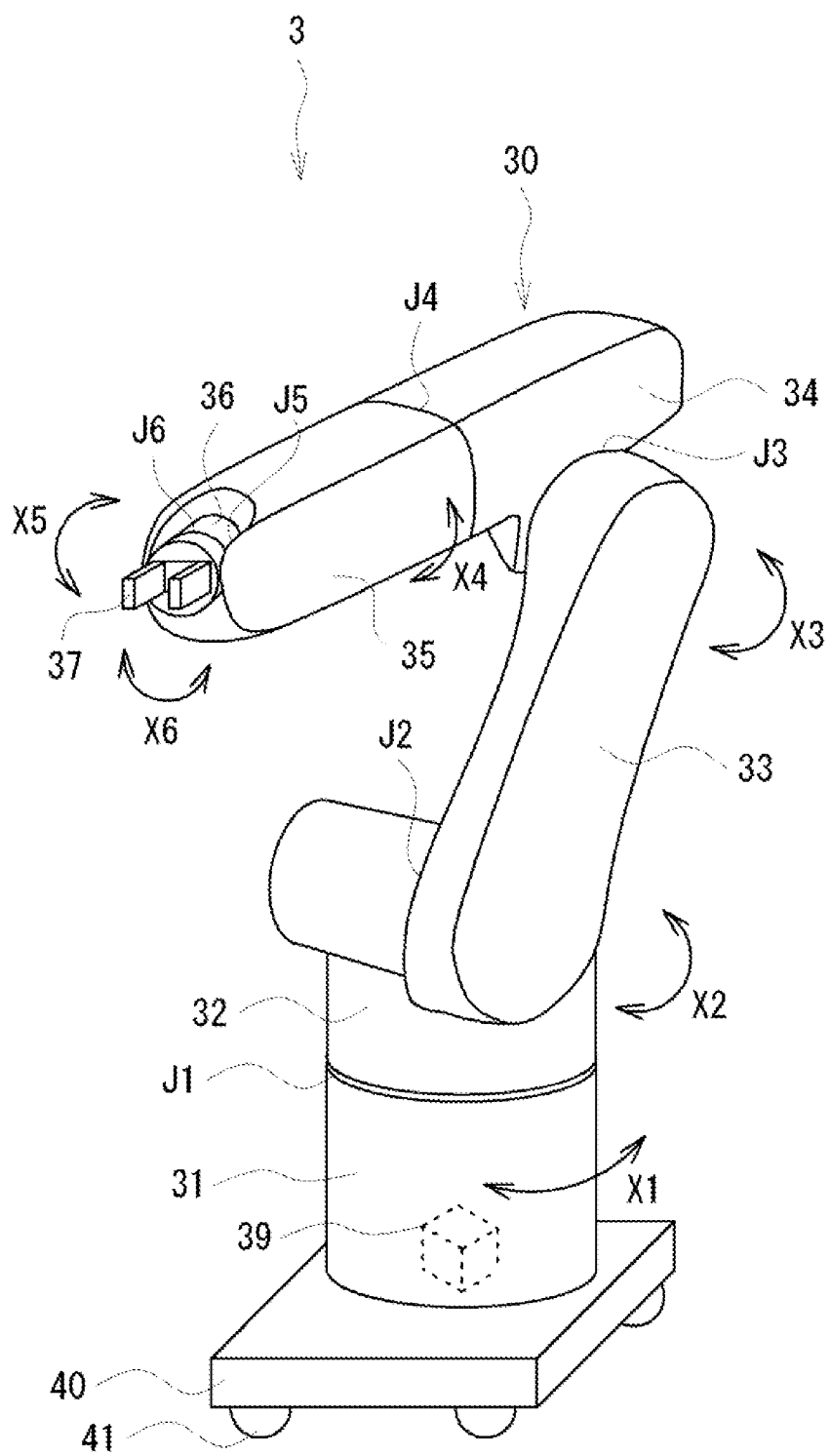
FIG. 2 is a perspective view of a robot arm 3.

Referring to FIG. 2, the robot arm 3 according to the present embodiment will be described. The robot arm 3 according to the present embodiment includes an arm unit 30. The arm unit 30 has a plurality of joint portions, and a posture can be changed by rotating each portion via the joint portion. Specifically, the arm unit 30 of the robot arm 3 according to the present embodiment includes a base 31, a shoulder 32, a lower arm 33, a first upper arm 34, a second upper arm 35, a wrist 36, and a holding unit 37. In FIG. 2, rotation axes X1 to X6 are respectively illustrated by illustrating directions around the rotation axes X1 to X6.

The base 31 supports the whole arm unit 30. The shoulder 32 is connected to an upper portion of the base 31 via a first joint portion J1. The shoulder 32 rotates with respect to the base 31 around the rotation axis X1 extending in a direction (vertical direction in the present embodiment) intersecting with a base 40 (details will be described later). One end portion of the lower arm 33 is connected to a portion of the shoulder 32 via a second joint portion J2. The lower arm 33 rotates with respect to the shoulder 32 around the rotation axis X2 extending in a horizontal direction. The first upper arm 34 is connected to an end portion of the lower arm 33 which is located on a side opposite to a side connected to the shoulder 32 via a third joint portion J3. The first upper arm 34 rotates with respect to the lower arm 33 around the rotation axis X3 extending in the horizontal direction. The second upper arm 35 is connected to a tip side (side having the holding unit 37) of the first upper arm 34 via a fourth joint portion J4. The second upper arm 35 rotates with respect to the first upper arm 34 around the rotation axis X4. The wrist 36 is connected to a tip side of the second upper arm 35 via a fifth joint portion J5. The wrist 36 rotates with respect to the second upper arm 35 around the rotation axis X5. The holding unit 37 is connected to a tip side of the wrist 36 via a sixth joint portion J6. The holding unit 37 rotates with respect to the wrist 36 around the rotation axis X6. A motor (for example, a step motor) for rotating each portion around each of the rotation axes X1 to X6 is incorporated into the arm unit 30.

The holding unit 37 holds and releases the object (for example, the eyeglass lens). As an example, the holding unit 37 according to the present embodiment holds and releases the object by causing an actuator to change a distance between a pair of holding pieces. However, a method for holding and releasing the object can be changed. For example, the holding unit 37 may switch between holding and releasing the object by switching between suctioning and releasing a surface of the object.

The arm unit 30 (specifically, the base part 31 of the arm unit 30) is fixed to the base 40. In the present embodiment, the base 40 is placed on a horizontal installation surface. The base 40 has an arm movement unit 41 that moves the arm unit 30 in a direction parallel to the installation surface. The arm movement unit 41 is driven so that the whole arm unit 30 moves in parallel on the installation surface. A configuration of the arm movement unit 41 can be appropriately selected. For example, the arm movement unit 41 may include a wheel and a motor for rotating the wheel. In addition, a belt conveyor may function as the arm movement unit. In addition, the base 40 (arm unit 30) may be fixed to the installation surface (details will be described later). In this case, the installation surface may be a wall surface extending in the vertical direction.

The robot arm 3 according to the present embodiment includes a control unit 39 that performs various controls (for example, controls for a motor that rotates each portion and an actuator that drives the holding unit 37). In addition, the robot arm 3 includes a memory device which stores an eyeglass lens peripheral edge processing program for performing a movement process (refer to FIGS. 4A to 4C) to be described later.

Furthermore, the robot arm 3 includes a detection unit (for example, an encoder) for detecting an angle of each portion in the arm unit 30 (for example, an angle of the shoulder 32 with respect to the base 31 and an angle of the lower arm 33 with respect to the shoulder 32). All angles of each portion of the arm unit 30 are detected by the detection unit. In this manner, a position of the holding unit 37 provided in a tip portion of the arm unit 30 is calculated. Therefore, for example, even in a case where a worker manually adjusts the angle of each portion of the arm unit 30 and moves the position of the holding unit 37 to a desired position, the control unit 39 of the robot arm 3 can detect the position of the moved holding unit 37 (for example, the position of the holding unit 37 with respect to the base 40). An example of the detailed configuration of the robot arm is disclosed in JP-A-2019-141970, for example.

As illustrated in FIG. 2, the robot arm 3 according to the present embodiment enables the holding unit 37 to pivot around a rotation axis (pivot axis) X1 extending in a direction intersecting with the installation surface (in the present embodiment, a vertical direction perpendicularly intersecting with the horizontal installation surface). Therefore, unlike a case where the eyeglass lens is moved between the plurality of devices by the conveyor, disposition of the plurality of eyeglass manufacturing devices 1 is less likely to be limited. In addition, the robot arm 3 according to the present embodiment can perform both an operation for pivoting the holding unit 37 to orient the holding unit 37 toward the eyeglass manufacturing device 1 and an operation for driving the arm unit 30 to change a distance between the eyeglass manufacturing device 1 and the holding unit 37. Therefore, the plurality of eyeglass manufacturing devices 1 are freely disposed in a further improved manner.

Referring back to FIG. 1, description will be continued. The control device 5 controls the whole eyeglass lens peripheral edge processing system 100. As an example, a personal computer (hereinafter, referred to as a "PC") is used as the control device 5 according to the present embodiment.

However, a device other than the PC (for example, at least one of a server, a tablet terminal, and a smartphone) may be used as the control device 5. In addition, the control unit of at least one of the plurality of eyeglass manufacturing devices 1 and the robot arm 3 may function as the controller that controls the whole eyeglass lens peripheral edge processing system 100. In addition, the control units of the plurality of devices may cooperate with each other to control the whole eyeglass lens peripheral edge processing system 100.

The control device 5 includes a CPU (controller) 51 that performs various control processes, and a memory device (NVM) 52. The memory device 52 stores an eyeglass lens peripheral edge processing program for performing a position storing process (refer to FIGS. 3A and 3B) and a movement process (refer to FIGS. 4A to 4C) (to be described later), and installation position information indicating installation positions 10A to 10C for each of the eyeglass manufacturing devices 1A to 1C. The control device 5 is connected to the plurality of eyeglass manufacturing devices 1 and the robot arm 3 via at least one of wired communication, wireless communication, and a network.

In addition, the control device 5 is connected to an operation unit 6 and a display unit 7. The operation unit 6 is operated by a user so that a worker (user) inputs various instructions to the eyeglass lens peripheral edge processing system 100. For example, as the operation unit 6, at least one of a keyboard, a mouse, and a touch panel can be used. A microphone for inputting various instructions may be used together with the operation unit 6 or in place of the operation unit 6. The display unit 7 displays various images. As a matter of course, an operation unit and a display unit which are included in the control device 5 may be used instead of the operation unit 6 and the display unit 7 which are externally connected to the control device 5.

(Outline of Steps)

Referring to FIG. 1, an outline of the plurality of steps performed on the eyeglass lens by the eyeglass lens peripheral edge processing system 100 according to the present embodiment will be described. As described above, the eyeglass lens peripheral edge processing system 100 according to the present embodiment performs the plurality of steps on the eyeglass lens in the order of an optical characteristic measurement step by the lens meter 1A (lens measurement step), a cup attachment step by the cup attachment device 1B (processing preparation step), and a processing step of processing the peripheral edge of the eyeglass lens by the lens processing device 1C. That is, in the present embodiment, out of the plurality of eyeglass manufacturing devices 1, the eyeglass manufacturing device 1 which first performs the step on the eyeglass lens is the lens meter 1A. In addition, out of the plurality of eyeglass manufacturing devices 1, the eyeglass manufacturing device 1 which lastly performs the step on the eyeglass lens is the lens processing device 1C.

Hereinafter, the installation position 10A of the eyeglass lens in the lens meter 1A will be referred to as a first installation position 10A. The installation position 10B of the eyeglass lens in the cup attachment device 1B will be referred to as a second installation position 10B. The installation position 10C of the eyeglass lens in the lens processing device 1C will be referred to as a third installation position 10C.

In the present embodiment, the eyeglass lens is installed at a predetermined standby position 8 before the plurality of steps are performed by the plurality of eyeglass manufacturing devices 1. Specifically, a worker installs a tray (not illustrated) at the standby position 8 in a state where the eyeglass lens to be processed by the eyeglass lens peripheral edge processing system 100 is placed on the tray. In addition, the eyeglass lens after the plurality of steps are completed by the plurality of eyeglass manufacturing devices 1 is moved to a predetermined completion position 9 (in the present embodiment, the tray installed at the completion position 9). The standby position 8 and the completion position 9 are separated from positions where the plurality of eyeglass manufacturing devices 1 are installed. The standby position 8 and the completion position 9 may be the same position.

In a case where the eyeglass lens peripheral edge processing system 100 according to the present embodiment processes the peripheral edge the eyeglass lens, the robot arm 3A first holds the eyeglass lens installed on the tray at the standby position 8 in a state where the arm unit 30 itself is moved to a first work position P1 in the vicinity of the standby position 8. Next, the robot arm 3A moves the arm unit 30 itself to a second work position P2 in the vicinity of the plurality of eyeglass manufacturing devices 1, and installs the eyeglass lens at the first installation position 10A of the lens meter 1A. When the optical characteristic measurement step is completed by the lens meter 1A, the robot arm 3A moves the eyeglass lens from the first installation position 10A of the lens meter 1A to the second installation position 10B of the cup attachment device 1B at the second work position P2. Thereafter, the robot arm 3A moves the arm unit 30 itself to the first work position P1 in preparation for the subsequent process of the eyeglass lens.

When the cup attachment step is completed by the cup attachment device 1B, the robot arm 3B moves the eyeglass lens from the second installation position 10B of the cup attachment device 1B to the third installation position 10C of the lens processing device 1C, in a state where the arm unit 30 itself is moved to the third work position P3 in the vicinity of the plurality of eyeglass manufacturing devices 1. When the processing step of processing the eyeglass lens peripheral edge is completed by the lens processing device 1C, the robot arm 3B holds the eyeglass lens installed at the third installation position 10C of the lens processing device 1C at the third work position P3. Thereafter, the arm unit 30 itself is moved to a fourth work position P4 in the vicinity of the completion position 9, and the eyeglass lens is placed on the tray at the completion position 9.

(Disposition of Each Device)

Referring to FIG. 1, disposition of each device in the eyeglass lens peripheral edge processing system 100 according to the present embodiment will be described. In the present embodiment, the plurality of eyeglass manufacturing devices 1 are disposed to surround the robot arm 3 along the circumferential direction round on the pivot axis X1 (refer to FIG. 2) around which the robot arm 3 installed on the installation surface (specifically, the robot arm 3A disposed at the second work position P2 and the robot arm 3B disposed at the third work position P3) pivots the holding unit 37. Therefore, compared to a case where the plurality of eyeglass manufacturing devices 1 are disposed on a straight line along the conveyor, a space for installing the eyeglass lens peripheral edge processing system 100 can be easily reduced. In addition, as described above, the robot arm 3 pivots the holding unit 37. In this manner, the robot arm 3 can easily move the eyeglass lens between the plurality of eyeglass manufacturing devices 1 disposed to surround the robot arm 3.

Specifically, in the present embodiment, in a case where the plurality of eyeglass manufacturing devices 1 are viewed in a direction of the pivot axis X1 of the robot arm 3 (that is, in the present embodiment, from above), the plurality of eyeglass manufacturing devices 1 are disposed clockwise or counterclockwise (clockwise in the present embodiment) in the order of performing the steps on the eyeglass lens. That is, in the present embodiment, the lens meter 1A that first performs the lens measurement step, the cup attachment device 1B that secondly performs the processing preparation step, and the lens processing device 1C that lastly performs the processing step are disposed clockwise in this order. Therefore, the robot arm 3 can smoothly move the eyeglass lens with respect to each of the plurality of eyeglass manufacturing devices 1 in the order of performing the steps.

Furthermore, in the present embodiment, the standby position 8 and the completion position 9 of the eyeglass lens together with the plurality of eyeglass manufacturing devices 1 are provided to surround the robot arm 3 along the circumferential direction round on the pivot axis X1. Specifically, in the order of moving the eyeglass lens (that is, the order of the standby position 8, the lens meter 1A, the cup attachment device 1B, the lens processing device 1C, and the completion position 9), the respective positions are disposed clockwise or counterclockwise (clockwise in the present embodiment). Therefore, a space for installing the eyeglass lens peripheral edge processing system 100 can be further reduced.

(Position Storing Process)

Referring to FIGS. 3A and 3B, a position storing process performed by the eyeglass lens peripheral edge processing system 100 according to the present embodiment will be described. In the position storing process, a process of storing a plurality of positions (storing target positions) required for moving the object (eyeglass lens in the present embodiment) to the robot arm 3 in the memory device (for example, the memory device 52 of the control device 5) are performed. The position storing process is performed when a position storing mode for storing the storing target positions is set. The storing target positions include the installation positions 10A to 10C of the eyeglass lens in each of the plurality of eyeglass processing devices 1. In addition, in the present embodiment, the standby position 8 and the completion position 9 are also included in the storing target positions. In addition, in the present embodiment, the passage position on the movement route of the eyeglass lens moved by the robot arm 3 is also included in the storing target positions.

In the eyeglass lens peripheral edge processing system 100 according to the present embodiment, when a start instruction of the position storing process (that is, an instruction to perform the position storing process) is input, the CPU 51 of the control device 5 performs the position storing process illustrated in FIGS. 3A and 3B in accordance with the eyeglass lens peripheral edge processing program stored in the memory device 52. However, as described above, the position storing process may be performed by a control unit other than the CPU 51 of the control device 5, or may be performed in cooperation with a plurality of the control units.

First, the CPU 51 causes the display unit 7 to display a screen for instructing a worker to set the standby position 8 (S1). In S1, for example, a message such as "please move the holding unit to the standby position and store the position" may be displayed on the display unit 7. Next, the CPU 51 performs a storing process of the standby position 8 (S2). In the present embodiment, the worker manually rotates the joint portions J1 to J6 of the arm unit 30 in a state where the robot arm 3A is located at the first work position P1, and moves the holding unit 37 to the standby position 8 (specifically, the position of the eyeglass lens on the tray installed at the standby position 8). Next, the worker operates the operation unit (for example, the operation unit 6 connected to the control device 5, or the operation unit of the robot arm 3A) to input a storing instruction of the standby position. In S2, the CPU 51 stores the position of the arm unit 30 itself of the robot arm 3A in the memory device 52 when the storing instruction is input, as the first work position P1. Furthermore, the CPU 51 stores the position of the holding unit 37 (including an angle of the holding unit 37) in the memory device 52 when the storing instruction is input, as the standby position 8 based on the first work position P1.

Next, the CPU 51 causes the display unit 7 to display a screen for instructing the worker to perform settings from the standby position 8 to the first installation position 10A of the lens meter 1A (S3). In S3, for example, a message such as "please store the installation position of the lens meter after storing the n-th number of the passage positions of the lens up to the installation position of the lens meter" may be displayed on the display unit 7. The CPU 51 stores the n-th number (n≥1) of the passage positions of the eyeglass lens on a first route from the standby position 8 to the first installation position 10A (S4) in the memory device 52. In the present embodiment, the worker inputs the position storing instruction the n-th number of times while manually moving the position of the arm unit 30 itself of the robot arm 3A and the position of the holding unit 37 of the arm unit 30 so that the holding unit 37 that holds the eyeglass lens passes through the proper first route. In S4, the CPU 51 stores the position of the arm unit 30 itself and the position of the holding unit 37 in the memory device 52, each time the storing instruction is input. As a result, the n-th number of passage positions on the first route is stored. Next, the CPU 51 performs a storing process of the first installation position 10A (S5). In a state where the robot arm 3A is located at the second work position P2, the worker manually moves the holding unit 37 to the first installation position 10A, and inputs the storing instruction. In S5, the CPU 51 stores the position of the arm unit 30 itself when the storing instruction is input, as the second work position P2. In addition, the CPU 51 stores the position of the holding unit 37 (including the angle of the holding unit 37) when the storing instruction is input, as the first installation position 10A based on the second work position P2.

Next, the CPU 51 causes the display unit 7 to display a screen for instructing the worker to perform settings from the first installation position 10A of the lens meter 1A to the second installation position 10B of the cup attachment device 1B (S6). The CPU 51 stores the n-th number (n≥1) of passage positions of the eyeglass lens on a second route from the first installation position 10A to the second installation position 10B (S7) in the memory device 52. The process of S7 according to the present embodiment is performed in a state where the position of the arm unit 30 itself is fixed to the second work position P2. Next, the CPU 51 performs the storing process of the second installation position 10B (S8). A main flow of the processes in S6 to S8 is the same as that of the above-described processes in S3 to S5, and thus, detailed description will be omitted.

Next, the CPU 51 causes the display unit 7 to display a screen for instructing the worker to perform settings from the second installation position 10B of the cup attachment device 1B to the third installation position 10C of the lens processing device 1C (S9). The CPU 51 stores the n-th number (n≥1) of passage positions of the eyeglass lens on a third route from the second installation position 10B to the third installation position 10C (S10) in the memory device 52. In a state where the robot arm 3B is located at the third work position P3, the worker inputs the position storing instruction the n-th number of times while manually moving the holding unit 37 so that the holding unit 37 passes through the proper third route. In S10, the CPU 51 stores the position of the holding unit 37 as the passage position, each time the storing instruction is input. Next, the CPU 51 performs the storing process of the third installation position 10C (S11).

In the present embodiment, in S10 and S11, the passage position and the third installation position 10C of the eyeglass lens in a case where the cup attachment device 1B attaches the cup at a reference position (for example, the center of the lens surface) of the eyeglass lens at a reference angle (for example, an angle parallel to an optical axis) are stored.

Next, the CPU 51 causes the display unit 7 to display a screen for instructing the worker to perform setting from the third installation position 10C to the completion position 9 of the lens processing device 1C (S12). The CPU 51 stores the n-th number (n≥1) of passage positions of the eyeglass lens on a fourth route from the third installation position 10C to the completion position 9 (S13) in the memory device 52. The CPU 51 performs the storing process of the completion position 9 (S14). As a result, the fourth work position P4 of the robot arm 3B and the completion position 9 based on the fourth work position P4 are stored in the memory device 52.

(Movement Process)

Figure 4A:
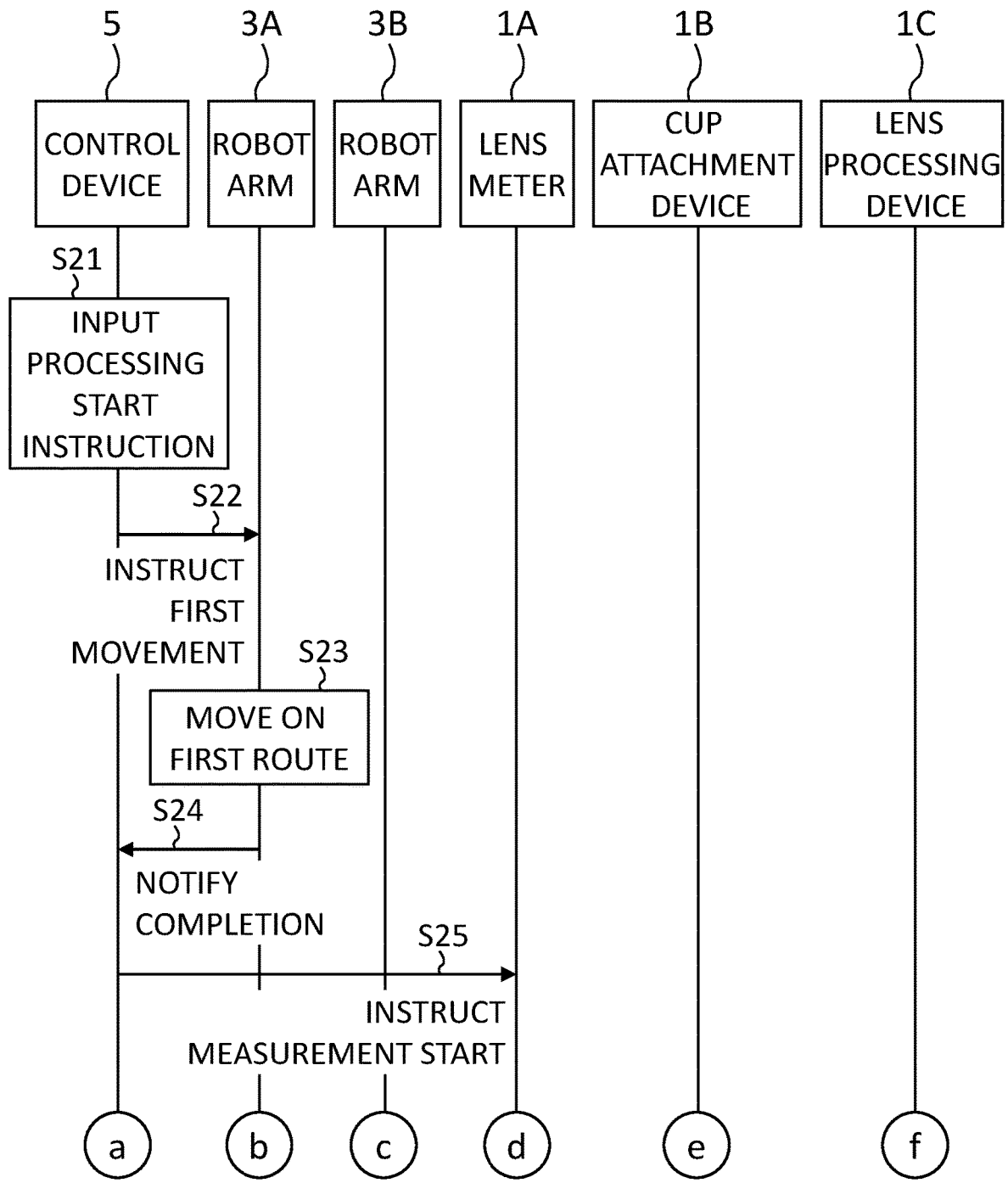
Figure 4C:
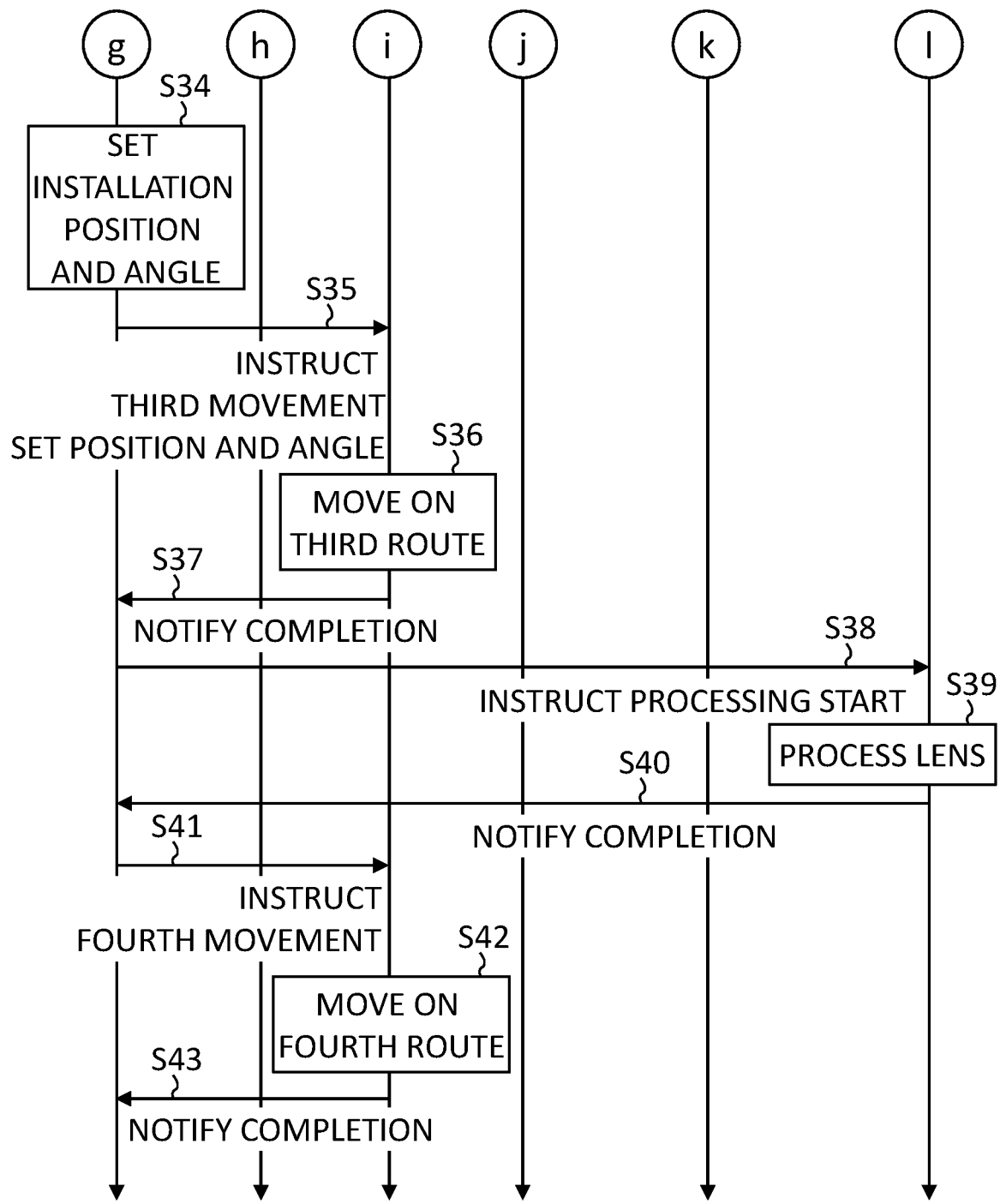

Referring to FIGS. 4A to 4C, a movement process performed by the eyeglass lens peripheral edge processing system 100 according to the present embodiment will be described. In the movement process, a process of moving the eyeglass lens by the robot arms 3A and 3B, and a process of performing the step for processing the peripheral edge of the eyeglass lens by each of the plurality of eyeglass manufacturing devices 1 are performed. The movement process is performed by the control unit of each device in accordance with the eyeglass lens peripheral edge processing program stored in the memory device of each device, when a movement mode (mode in which the eyeglass lens is moved and each step is performed by the plurality of eyeglass manufacturing devices 1) is set.

First, the CPU 51 of the control device 5 receives an input of an instruction to start the processing of the peripheral edge of the eyeglass lens (S21). The worker inputs a processing start instruction to the control device 5 by operating the operation unit 6 in a state where the tray having the eyeglass lens placed thereon is installed at the standby position 8 (refer to FIG. 1). When the processing start instruction is input in S21, the CPU 51 determines whether or not both the robot arm 3A and the lens meter 1A are in an operation-stopped state. When a completion notification (at least one of S24, S27, and S30) (to be described later) is not input after an operation instruction (S22, S25, and S38) and at least one of the robot arm 3A and the lens meter 1A is in an operation state, both of these are brought into a standby state. When both the robot arm 3A and the lens meter 1A are in the operation-stopped state, the CPU 51 outputs (transmits) a first movement instruction to the robot arm 3A (S22). The first movement instruction is an instruction to move the eyeglass lens from the standby position 8 to the first installation position 10A of the lens meter 1A through the above-described first route.

When receiving the first movement instruction, based on the first work position P1, the second work position P2, the standby position 8, the first installation position 10A, and the passage position on the first route which are stored in the position storing process (refer to FIGS. 3A and 3B), the control unit 39 of the robot arm 3A controls the operation of the arm unit 30 and the arm movement unit 41 so that the eyeglass lens is moved from the standby position 8 to the first installation position 10A (S23). Specifically, the control unit 39 of the robot arm 3A causes the holding unit 37 to hold the eyeglass lens installed at the standby position 8, in a state where the arm unit 30 itself is moved to the first work position P1. Next, the control unit 39 moves the arm unit 30 itself to the second work position P2 while causing the eyeglass lens to pass through the passage position on the first route, and moves the eyeglass lens to the first installation position 10A of the lens meter 1A. The control unit 39 releases the eyeglass lens held by the holding unit 37 to install the eyeglass lens at the first installation position 10A.

As described above, the robot arm 3 performs both an operation for pivoting the holding unit 37 to orient the holding unit 37 toward each position and an operation for driving the arm unit 30 to change a distance between each position and the holding unit 37. Therefore, the eyeglass lens is properly moved regardless of the disposition of each position.

The control unit 39 of the robot arm 3A notifies the control device 5 that the eyeglass lens is completely moved to the first installation position 10A (S24). The CPU 51 of the control device 5 transmits an instruction to start measuring the optical characteristic of the eyeglass lens to the lens meter 1A (S25). The control unit of the lens meter 1A measures the optical characteristic of the eyeglass lens installed at the first installation position 10A, and marks a point at a position of the optical center of the eyeglass lens (S26). When the process in S26 is completed, the control unit of the lens meter 1A notifies the control device 5 of the completion of the process (S27).

When receiving the completion notification transmitted in S27, the CPU 51 of the control device 5 determines whether or not both the robot arm 3A and the cup attachment device 1B are in an operation-stopped state. When at least one of the robot arm 3A and the cup attachment device 1B is in an operation state, both of these are brought into a standby state. When both the robot arm 3A and the cup attachment device 1B are in the operation-stopped state, the CPU 51 transmits a second movement instruction to the robot arm 3A (S28). The second movement instruction is an instruction to move the eyeglass lens from the first installation position 10A of the lens meter 1A to the second installation position 10B of the cup attachment device 10B through the above-described second route.

When receiving the second movement instruction, based on the second work position P2, the first installation position 10A, the second installation position 10B, and the passage position on the second route which are stored in the position storing process (refer to FIGS. 3A and 3B), the control unit 39 of the robot arm 3A controls the operation of the arm unit 30 and the arm movement unit 41 so that the eyeglass lens is moved from the first installation position 10A to the second installation position 10B (S29). Specifically, the control unit 39 of the robot arm 3A causes the holding unit 37 to hold the eyeglass lens installed at the first installation position 10A, in a state where the arm unit 30 itself is moved to the second work position P2. Next, the control unit 39 moves the eyeglass lens to the second installation position 10B of the cup attachment device 1B while causing the eyeglass lens to pass through the passage position on the second route. Here, the robot arm 3A pivots the holding unit 37 around the pivot axis X1 (refer to FIG. 2) to move the eyeglass lens from the first installation position 10A to the second installation position 10B. The control unit 39 releases the eyeglass lens held by the holding unit 37 to install the eyeglass lens at the second installation position 10B.

The control unit 39 of the robot arm 3A notifies the control device 5 that the eyeglass lens is completely moved to the second installation position 10B (S30). The CPU 51 of the control device 5 transmits an instruction to start attaching the cup to the cup attachment device 1B (S31). The control unit of the cup attachment device 1B attaches the cup to the lens surface of the eyeglass lens, based on a position of the point marked by the lens meter 1A (S32). When the process in S32 is completed, the control unit of the cup attachment device 1B notifies the control device 5 of information of the cup position and information of the attachment angle, together with the completion notification of the process (S33). As described above, the information of the cup position is information of the position on the lens surface where the cup is attached to the eyeglass lens. In addition, the information of the attachment angle is information of the angle of the cup attached to the eyeglass lens with respect to the eyeglass lens.

When receiving the completion notification, the information of the cup position, and the information of the attachment angle which are transmitted in S33, the CPU 51 of the control device 5 sets the third installation position 10B of the lens processing device 1C and the angle of the eyeglass lens at the third installation position 10B (S34). At least one of the information of the cup position and the information of the attachment angle may be stored in advance in a memory device (for example, the memory device 52 of the control device 5). In this case, the CPU 51 may acquire the information stored in the memory device.

Figure 5:
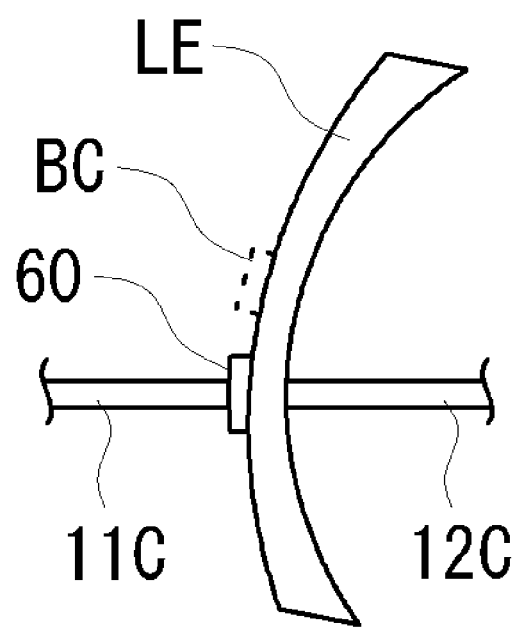
FIG. 5 is a view illustrating an example of a state where an eyeglass lens LE is mounted after being pinched by chuck shafts 11C and 12C of a lens processing device 1C.

Referring to FIG. 5, an example of a method for setting the third installation position 10C and the angle of the eyeglass lens, based on the information of the cup position and the information of the attachment angle, will be described. As described above, the lens processing device 1C mounts an eyeglass lens LE by causing the pair of chuck shafts 11C and 12C to pinch the eyeglass lens LE. Specifically, the lens processing device 1C mounts the eyeglass lens LE by causing the cup attachment device 1B to mount the chuck shaft 11C on the cup 60 attached to the eyeglass lens LE. Here, in a case where the cup 60 is always mounted at a reference position BC (center of the lens surface in the example illustrated in FIG. 5) of the eyeglass lens LE at a reference angle (angle parallel to the optical axis in the example illustrated in FIG. 5), it is not necessary to adjust the third installation position 10C and the angle of the eyeglass lens LE. However, the attachment position and angle of the cup 60 with respect to the eyeglass lens LE vary. In a case where the third installation position 10C and the angle of the eyeglass lens LE are not adjusted according to the attachment position and the angle of the cup 60, there is a possibility that the chuck shaft 11C may not be mounted on the cup 60.

Based on the information of the cup position which is transmitted in S33, the CPU 51 sets (adjusts) the third installation position 10C so that the chuck shaft 11C of the lens processing device 1C and the cup 60 attached to the eyeglass lens LE coincide with each other. As an example, in the position storing process (refer to FIGS. 3A and 3B) according to the present embodiment, the third installation position 10C of the eyeglass lens LE and the angle of the eyeglass lens LE at the third installation positions 10C in a case where the cup 60 is attached at the reference position BC of the eyeglass lens LE at the reference angle are stored. Based on the information of the cup position which is transmitted in S33, the CPU 51 acquires a direction and a distance in which the position of the cup 60 is displaced from the reference position BC of the eyeglass lens LE, and adjusts the third installation position 11C of the eyeglass lens LE so that the displaced direction and distance are offset.

In addition, based on the information of the attachment angle which is transmitted in S33, the CPU 51 sets (adjusts) the angle at the third installation position 10C of the eyeglass lens LE to which the cup 60 is attached. As an example, in the present embodiment, based on the information of the attachment angle which is transmitted in S33, the CPU 51 acquires the displacement between the reference angle (angle parallel to the optical axis) and the attachment angle, and adjusts the angle of the eyeglass lens LE at the installation position 11C so that the displacement of the acquired angle is offset.

Referring back to FIGS. 4A to 4C, description will be continued. The CPU 51 of the control device 5 determines whether or not both the robot arm 3B and the lens processing device 1C are in the operation-stopped state. When at least one of the robot arm 3B and the lens processing device 1C is in the operation state, both of these are brought into the standby state. When both the robot arm 3B and the lens processing device 1C are in the operation-stopped state, the CPU 51 transmits a third movement instruction, and the third installation position 11C and the angle which are set in S34, to the robot arm 3B (S35). The third movement instruction is an instruction to move the eyeglass lens from the second installation position 10B of the cup attachment device 1B to the third installation position 10C of the lens processing device 1C through the above-described third route.

When receiving the third movement instruction, based on the third work position P3 stored in the position storing process (refer to FIGS. 3A and 3B), the second installation position 10B, the additional position on the third route, and the third installation position 11C and the angle which are transmitted in S35, the control unit 39 of the robot arm 3B moves the eyeglass lens from the second installation position 11B to the third installation position 10C (S36). Specifically, in a state where the arm unit 30 itself is moved to the third work position P3, the control unit 39 of the robot arm 3B causes the holding unit 37 to hold the eyeglass lens installed at the second installation position 10B. Next, the control unit 39 moves the eyeglass lens at a designated angle to the third installation position 10C transmitted in S35 while causing the eyeglass lens to pass through the passage position on the third route. The control unit 39 releases the eyeglass lens held by the holding unit 37 to install the eyeglass lens at the third installation position 10C. The control unit 39 may consider the information of the cup position and the information of the attachment angle, when the eyeglass lens is caused to pass through the passage position on the third route.

The control unit 39 of the robot arm 3B notifies the control device 5 that the eyeglass lens is completely moved to the third installation position 10C (S37). The CPU 51 of the control device 5 transmits an instruction to start processing the eyeglass lens, to the lens processing device 1C (S38). The control unit of the lens processing device 1C processes the peripheral edge of the eyeglass lens in accordance with the target lens shape measured by an eyeglass frame shape measurement device (not illustrated) (S39). When the process in S39 is completed, the control unit of the lens processing device 1C transmits the completion notification of the process to the control device 5 (S40).

When receiving the completion notification transmitted in S40, the CPU 51 of the control device 5 determines whether or not the robot arm 3B is in the operation-stopped state. When the robot arm 3B is in the operation state, the robot arm 3B is brought into the standby state. When the robot arm 3B is in the operation-stopped state, the CPU 51 transmits a fourth movement instruction to the robot arm 3B (S41). The fourth movement instruction is an instruction to move the eyeglass lens from the third installation position 10C of the lens processing device 1C to the completion position 9 through the above-described fourth route.

When receiving the fourth movement instruction, based on the third work position P3, the fourth work position P4, the third installation position 10C, the completion position 9, and the passage position on the fourth route, the control unit 39 of the robot arm 3B controls the operation of the arm unit 30 and the arm movement unit 41 so that the eyeglass lens is moved from the third installation position 10C to the completion position 9 (S42). The control unit 39 of the robot arm 3B notifies the control device 5 that the eyeglass lens is completely moved to the completion position 9 (S43).

As described above, in the eyeglass lens peripheral edge processing system 100 according to the present embodiment, the eyeglass lens is moved by the robot arm 3 between the plurality of eyeglass manufacturing devices 1 in different housings for performing different steps. Furthermore, the arm unit 30 of the robot arm 3 has the plurality of joint portions J1 to J6. Accordingly, compared to a case where the eyeglass lens is moved between the plurality of devices by a robot having a single rotation axis or a conveyor, a positional relationship between the plurality of eyeglass manufacturing devices 1 is less likely to be limited.

As illustrated in FIG. 2, the robot arm 3 according to the present embodiment can pivot the holding unit 37 around the rotation axis (for example, the rotation axis X1) extending in the direction which intersects with the installation surface (base 40) to orient the holding unit 37 toward each of the eyeglass manufacturing devices 1. Therefore, in contrast to a case where the eyeglass lens is moved between the plurality of devices by the conveyor, the disposition of the plurality of devices is much less likely to be limited.

Modification Example

Figure 6:
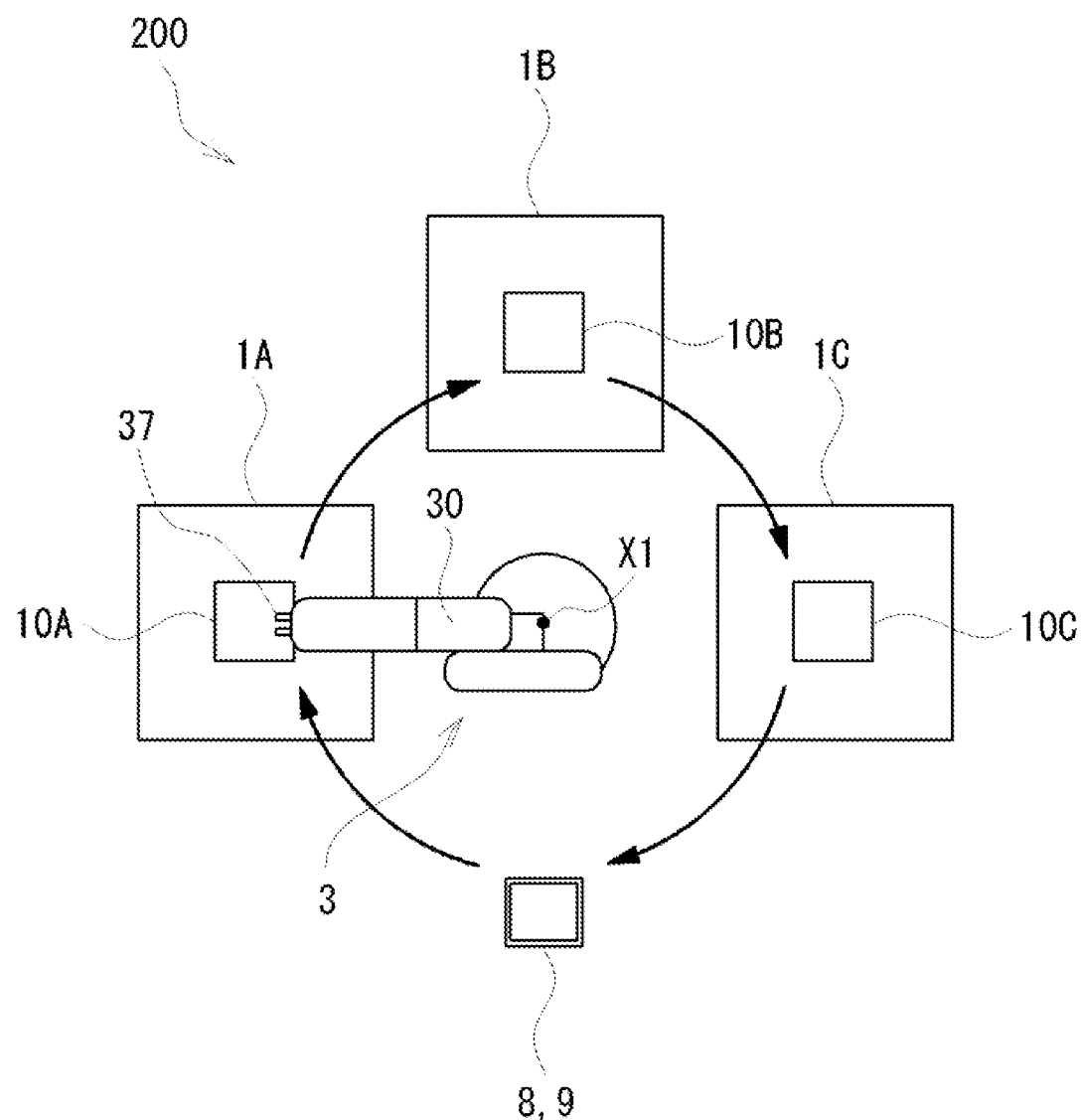
FIG. 6 is a schematic plan view of an eyeglass lens peripheral edge processing system 200 according to a modification example.

Referring to FIG. 6, one of modification examples of the above-described embodiment will be described. FIG. 6 is a plan view of an eyeglass lens peripheral edge processing system 200 according to the modification example. The modification example illustrated in FIG. 6 adopts the same devices as the lens meter 1A, the cup attachment device 1B, the lens processing device 1C, and the robot arm 3 which are used in the above-described embodiment. However, whereas the two robot arms 3A and 3B are used in the above-described embodiment, one robot arm 3 is used in the modification example illustrated in FIG. 6. In this way, the number of the robot arms 3 used in the eyeglass lens peripheral edge processing system may be one, or may be three or more. In addition, although the robot arms 3A and 3B according to the above-described embodiment move on the installation surface, the robot arm 3 is fixed in the modification example illustrated in FIG. 6. In this way, a position of the arm unit 30 of the robot arm 3 may be fixed.

In the modification example illustrated in FIG. 6, the plurality of eyeglass manufacturing devices 1 are disposed to surround the robot arm 3 along the circumferential direction round on the pivot axis X1 of the robot arm 3 having a fixed installation position. Therefore, a space for installing the eyeglass lens peripheral edge processing system 200 is reduced.

In addition, in the modification example illustrated in FIG. 6, in a case where the plurality of eyeglass manufacturing devices 1 are viewed in the direction of the pivot axis X1 of the robot arm 3 (that is, in the present embodiment, from above), the plurality of eyeglass manufacturing devices 1 are disposed clockwise or counterclockwise (clockwise in the present embodiment) in the order of performing the steps on the eyeglass lens. That is, the lens meter 1A that first performs the lens measurement step, the cup attachment device 1B that secondly performs the processing preparation step, and the lens processing device 1C that lastly performs the processing step are disposed clockwise in this order. Therefore, the robot arm 3 pivots the holding unit 37 around the pivot axis X1. Therefore, the robot arm 3 can smoothly move the eyeglass lens with respect to each of the plurality of eyeglass manufacturing devices 1 in the order of performing the steps.

Furthermore, in the modification example illustrated in FIG. 6, together with the plurality of eyeglass manufacturing devices 1, the standby position 8 and the completion position 9 (same position in FIG. 6) of the eyeglass lens are also disposed to surround the robot arm 3 along the circumferential direction round on the pivot axis X1. Specifically, in the order of moving the eyeglass lens (that is, the order of the standby position 8, the lens meter 1A, the cup attachment device 1B, the lens processing device 1C, and the completion position 9), the respective positions are disposed clockwise. Therefore, a space for installing the eyeglass lens peripheral edge processing system 200 can be further reduced.

The techniques disclosed in the above-described embodiment and modification example are merely examples. Therefore, it is possible to change the techniques described as an example in the above-described embodiment and modification example. For example, the eyeglass lens peripheral edge processing system may adopt only a part of a plurality of the techniques described as an example in the above-described embodiment and modification example. In addition, the robot arm 3 may be fixed to a wall surface extending in the vertical direction, instead of the horizontal installation surface. In addition, in the above-described embodiment and modification example, the robot arm 3 directly moves the eyeglass lens from the installation position 10 of one eyeglass manufacturing device 1 to the installation position 10 of another eyeglass manufacturing device 1. However, the robot arm 3 may temporarily move the eyeglass lens to the other position (for example, the tray at the standby position 8 or the completion position 9) while moving the eyeglass lens between the plurality of installation positions 10.

1 eyeglass manufacturing device
1A lens meter
1B cup attachment device
1C lens processing device
3 robot arm
5 control device
10A first installation position
10B second installation position
10C third installation position
11C, 12C chuck shaft
30 arm unit
37 holding unit
39 control unit
40 base 41 arm movement unit
51 CPU
52 memory device
60 cup
100, 200 eyeglass lens peripheral edge processing system
J1 to J6 joint portion
X1 pivot axis
LE eyeglass lens

What is claimed is:

1. An eyeglass lens peripheral edge processing system that processes a peripheral edge of an eyeglass lens, comprising:
a plurality of eyeglass manufacturing devices that perform mutually different steps out of a plurality of steps for processing the eyeglass lens, and that include mutually different housings; and
a robot arm that includes an arm unit having a plurality of joint portions, and a holding unit provided in the arm unit to hold and release an object, and that rotates the arm unit via the joint portion to move the object held by the holding unit,
wherein the robot arm rotates the arm unit to move at least an eyeglass lens serving as the object between the plurality of eyeglass manufacturing devices; and
wherein the plurality of eyeglass manufacturing devices include:
a cup attachment device that attaches a cup to a lens surface of the eyeglass lens; and
a lens processing device that mounts the eyeglass lens with using the cup attached to the eyeglass lens by the cup attachment device as a jig, and processes a peripheral edge of the mounted eyeglass lens.

2. The eyeglass lens peripheral edge processing system according to claim 1,
wherein the robot arm pivots the holding unit around a rotation axis extending in a direction which intersects with an installation surface to orient the holding unit toward each of the eyeglass manufacturing devices, to move the eyeglass lens between the plurality of eyeglass manufacturing devices.

3. The eyeglass lens peripheral edge processing system according to claim 2,
wherein the plurality of eyeglass manufacturing devices are disposed to surround the robot arm along a circumferential direction round on the rotation axis around which the robot arm installed on the installation surface pivots the holding unit.

4. The eyeglass lens peripheral edge processing system according to claim 1,
wherein the robot arm further includes an arm movement unit that moves the arm unit in a direction which is at least parallel to a placement surface.

5. The eyeglass lens peripheral edge processing system according to claim 1, further comprising additional robot arms, wherein each of the additional robot arms is configured to move a respective different eyeglass lens.

6. An eyeglass lens peripheral edge processing system that processes a peripheral edge of an eyeglass lens, comprising:
a plurality of eyeglass manufacturing devices that perform mutually different steps out of a plurality of steps for processing the eyeglass lens, and that include mutually different housings;
a robot arm that includes an arm unit having a plurality of joint portions, and a holding unit provided in the arm unit to hold and release an object, and that rotates the arm unit via the joint portion to move the object held by the holding unit; and
a controller that performs:
a position storing process of storing installation position information indicating an installation position where the eyeglass lens is installed and unloaded for each of the plurality of eyeglass manufacturing devices, in a memory device; and
a movement process of controlling an operation of the robot arm based on the installation position information stored in the memory device, to move the eyeglass lens from the installation position of one device out of the plurality of eyeglass manufacturing devices to the installation position of another device out of the plurality of eyeglass manufacturing devices; and
wherein the plurality of eyeglass manufacturing devices include:
a cup attachment device that attaches a cup to a lens surface of the eyeglass lens; and
a lens processing device that mounts the eyeglass lens with mounting a chuck shaft on the cup attached to the eyeglass lens by the cup attachment device, and processes a peripheral edge of the mounted eyeglass lens.

7. The eyeglass lens peripheral edge processing system according to claim 6,
wherein the controller:
further stores standby position information indicating a standby position where the eyeglass lens stands before the plurality of steps are performed by the plurality of eyeglass manufacturing devices in the memory device, during the position storing process, and
controls the operation of the robot arm based on the standby position information and the installation position information stored in the memory device, to move the eyeglass lens from the standby position to the installation position of the eyeglass manufacturing device, which first performs a step on the eyeglass lens, out of the plurality of eyeglass manufacturing devices.

8. The eyeglass lens peripheral edge processing system according to claim 7,
wherein the controller:
further stores completion position information indicating a completion position where the eyeglass lens reaches after the plurality of steps by the plurality of eyeglass manufacturing devices are completed, during the position storing process, and
controls the operation of the robot arm based on the installation position information and the completion position information stored in the memory device, to move the eyeglass lens to the completion position from the installation position of the eyeglass manufacturing device, which lastly performs a step on the eyeglass lens, out of the plurality of eyeglass manufacturing devices.

9. The eyeglass lens peripheral edge processing system according to claim 6,
wherein the controller:
further stores passage position information indicating a passage position on a movement route of the eyeglass lens moved by the robot arm in the memory device in addition to the installation position information, during the position storing process, and controls the operation of the robot arm based on the installation position information and the passage position information stored in the memory device, to move the eyeglass lens to pass through the passage position.

10. The eyeglass lens peripheral edge processing system according to claim 1,
wherein the controller:
   acquires information of a cup position on the lens surface where the cup is attached by the cup attachment device, and
   moves the eyeglass lens to the installation position where the chuck shaft of the lens processing device and the cup position coincide with each other, based on the information of the cup position, when the eyeglass lens is moved to the installation position of the lens processing device.

11. The eyeglass lens peripheral edge processing system according to claim 1,
wherein the controller:
   acquires information of an attachment angle at which the cup attached to the eyeglass lens by the cup attachment device is attached to the eyeglass lens, and
   sets an angle at the installation position of the eyeglass lens to which the cup is attached, based on the information of the attachment angle, when the eyeglass lens is moved to the installation position of the lens processing device.

* * * * *